INVENTOR.
Theodore F. Schlicksupp

INVENTOR.
Theodore F. Schlicksupp

Sept. 19, 1961　　　T. F. SCHLICKSUPP　　　3,000,055
GRINDING, MIXING AND FEEDING APPARATUS FOR
PLASTIC MOLDING MACHINES
Filed July 25, 1957　　　　　　　　　　　　3 Sheets-Sheet 3

*INVENTOR.*
Theodore F. Schlicksupp
BY
Pennie, Edmonds, Morton, Barrows & Taylor

HIS ATTORNEYS

United States Patent Office 3,000,055
Patented Sept. 19, 1961

3,000,055
GRINDING, MIXING AND FEEDING APPARATUS FOR PLASTIC MOLDING MACHINES
Theodore F. Schlicksupp, Essex Fells, N.J. (% Foremost Machine Builders, Inc., 83 Dorsa Ave., Livingston, N.J.); H. Michael Albers, executor of the estate of Theodore F. Schlicksupp, deceased
Filed July 25, 1957, Ser. No. 674,230
1 Claim. (Cl. 18—30)

This invention relates to apparatus for reutilizing plastic scrap, and more particularly to apparatus for grinding such scrap material in a continuous manner and for supplying fresh plastic in a regulated amount and adding it in a continuous manner to the continuously produced ground scrap material and intimately mixing the ground and fresh plastic and conveying such mixture to plastic molding apparatus or other place of storage or use.

In the operation of plastic molding machines such, for example as machines for molding thermoplastic or thermosetting materials, it is customary for the molded products coming from the machine to be separated from the scrap plastic material formed in the sprue, runners and channels of the molding apparatus, this material being known collectively as sprue scrap. A considerable quantity of this sprue scrap is produced. However, when reheated it requires a higher temperature than fresh plastic to produce the desired flowability. Consequently a certain proportion of fresh plastic is mixed with the scrap plastic.

The sprue scrap has heretofore been stored in bins and then ground in a suitable grinding machine to the appropriate grain size. The ground scrap was again stored until used, when it was mixed with fresh plastic and again fed to the molding machine. Bins must be provided both for storing the sprue scrap before it is ground and for containing the ground scrap until its reuse. Also thorough mixing of the fresh plastic and ground waste plastic is important and has constituted something of a problem.

The primary object of the present invention is to provide an apparatus that will grind the sprue scrap, add a regulated amount of fresh plastic material to the ground scrap and convey the mixture of ground and fresh scrap to a place of use or storage in thoroughly mixed condition.

Another object of the invention is to provide an apparatus of this kind which can be used along side a molding machine so that the sprue scrap, separated from the molded articles as they are removed from the mold, can be immediately and continuously placed in the hopper of the grinder, thereby eliminating the necessity for storing, and then immediately and continuously returned to the molding machine after adding and thoroughly mixing therewith the required amount of fresh plastic, thus eliminating the necessity for storage of the ground plastic scrap.

Another object of the invention is to provide apparatus for continuously replenishing the fresh plastic in the bin of the grinder-mixer-conveyer apparatus.

In accordance with my invention the scrap plastic material as it is separated from the molded articles alongside the molding machine is continuously introduced into the hopper of the grinder for continuously grinding this material and discharging the ground scrap. The ground scrap is discharged in a grain size ordinarily to pass through a screen of from ⅛ to ³⁄₁₆″ mesh screen and is discharged in a continuous manner. Means are provided for supplying fresh plastic in a regulated amount and for adding the same in a continuous manner to the continuously produced ground scrap. Pneumatic means is arranged to receive this admixture and for mixing and conveying the same to the hopper of the molding apparatus. The supply of fresh or virgin plastic is continuously replenished by means of an air-lift device in the form of a spear which can be readily inserted in a drum or container of fresh plastic in pellet or granular form.

The invention will be better understood from a consideration of the accompanying drawings wherein one embodiment of the invention is illustrated. In these drawings.

Figure 1:
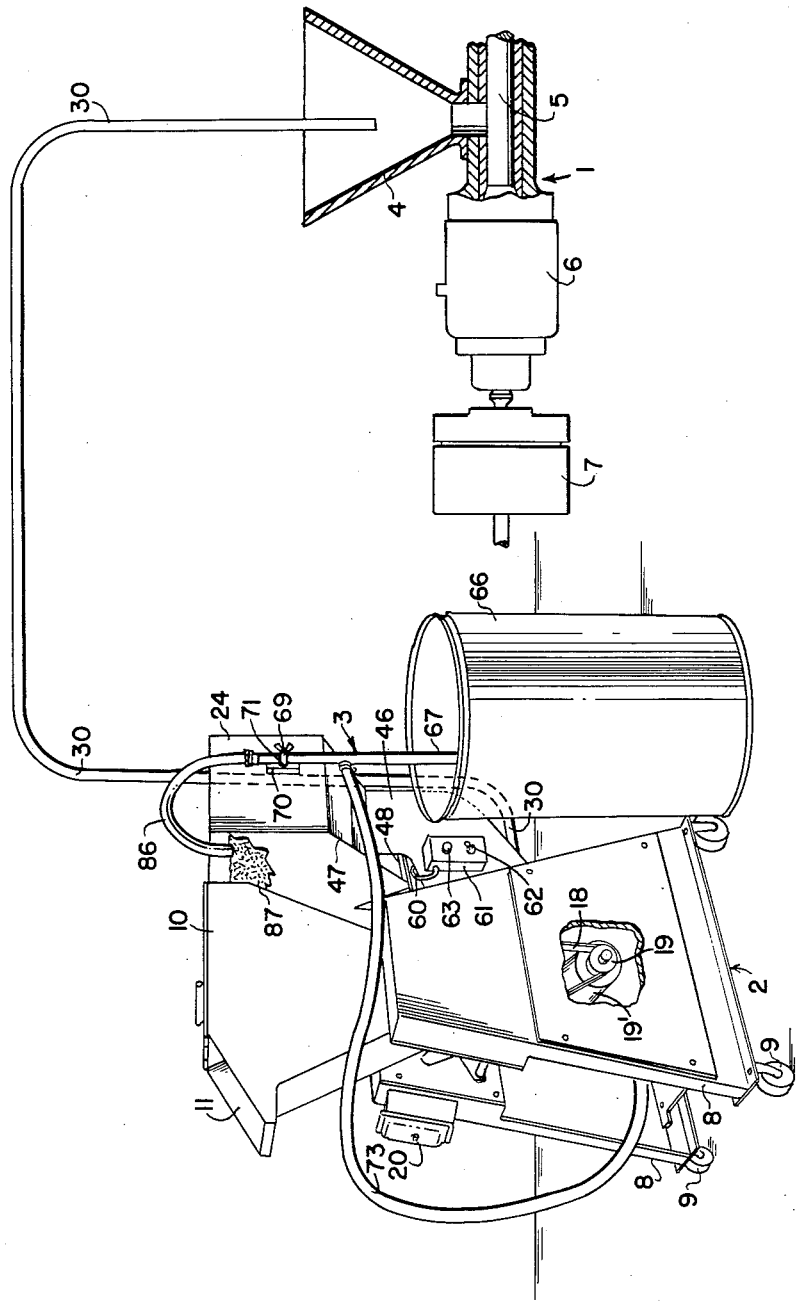
FIG. 1 is a perspective view of my improved apparatus placed alongside of a thermoplastic molding apparatus which is shown diagrammatically.

Referring now to the drawings, in FIG. 1 is shown the diagrammatic outline of a thermoplastic molding machine indicated generally by reference numeral 1, and alongside of this apparatus at the left is the apparatus of the present invention which comprises the grinder-mixer-conveyer 2 and the air-lift device 3. The molding apparatus comprises a hopper 4 to receive the plastic stock, a plunger 5, which is operated by any suitable power means (not shown), a heating section 6 and a mold section 7, the latter being in two separable parts to facilitate removal of the molded articles.

The grinder-mixer-conveyer 2 comprises a frame 8 consisting of similar front and rear sections constructed of appropriate steel shapes joined together by suitable cross members, and the whole supported on casters 9 so that it can be readily moved into proximity with any desired molding machine. Supported above and between the front and rear frame sections 8 there is a hopper 10 having downwardly converging side walls so that the plastic scrap which is placed in the mouth 11 of the hopper will be guided downwardly by gravity to the grinder or cutter mechanism 12.

This mechanism comprises a rotary cutter 13 having a pair of blades 14 which cooperate with two stationary blades 15 supported rigidly in position by the frame 8. The rotary cutter 13 has a shaft extension 16 at each end and these shafts rotate in bearings mounted on frame 8. A combined balance wheel and pulley 17 (not shown) is mounted on the front shaft 16 as viewed in FIG. 2 and is connected by means of a V-belt 18 to the pulley 19 of a driving motor 19′ (FIG. 1) mounted on frame 8. A control switch 20 (FIG. 1) is provided for starting and stopping the cutter driving motor.

Below and surrounding the rotary cutter 13 there is a perforated semi-circular screen or sieve member 21, the perforations in this member being such that the plastic material is retained thereby until the cutter mechanism 12 has reduced it to the desired grain size. All particles which are of this size, say for example, ⅛ to ³⁄₁₆″, or smaller, then fall through the perforations into a receiving chamber 22.

Figure 2:
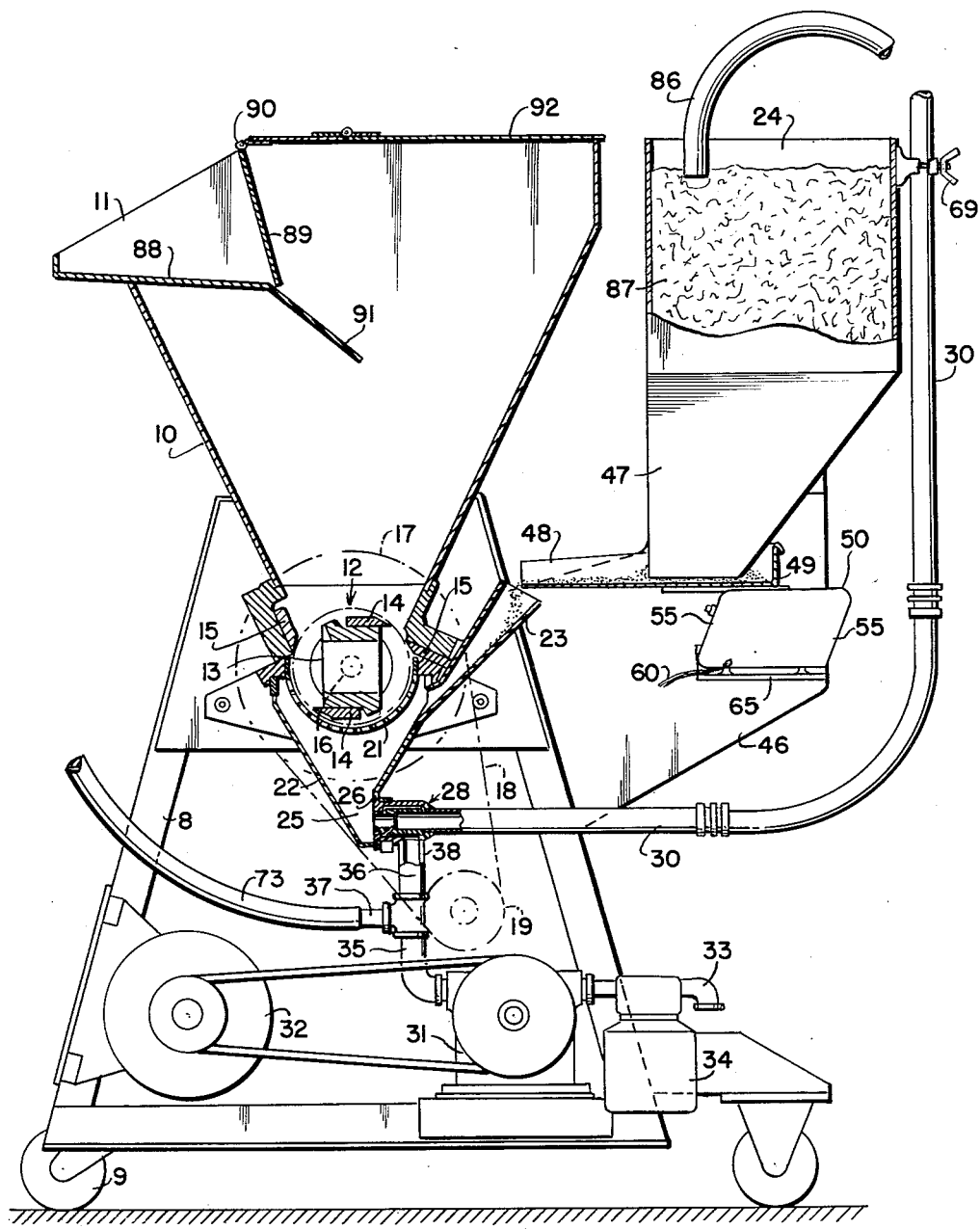
FIG. 2 is a view of the grinding, mixing and transferring apparatus in vertical, central section.

At the right of the apparatus, as shown in FIG. 2, receiving chamber 22 is provided with a funnel-shaped inlet 23 the upper end of which is open and the lower end of which is mounted in fixed position in an opening in the wall of chamber 22. Fresh plastic material of appropriate grain size is contained in a bin 24 arranged at the right of hopper 10 and is fed in a regulated amount into the funnel member 23 and added to the ground scrap or used plastic material which descends into this chamber from the perforated member 21 of the grinder. The details of this bin and feed mechanism will be described presently.

Figure 4:
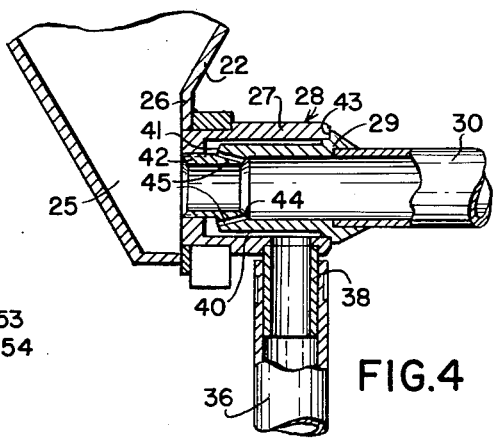
FIG. 4 is another detail view drawn to a similar scale to illustrate a part of the pneumatic conveyer and mixer.

The admixture of the ground scrap and fresh plastic descends continuously to the narrow discharge section or pocket 25 of chamber 22. As shown in FIG. 2 this discharge section is supported at the bottom of the converging walls of chamber 22, one of these walls having a vertical portion 26 with an aperture therein. Within this aperture is secured the left end of the body member 27 of a pneumatic combined mixing and conveying device or mechanism 28 shown in detail in FIG. 4. This device also has a hollow member 29 to which a delivery pipe 30 is connected and this pipe discharges into the hopper 4 of the molding apparatus 1.

Air under pressure is supplied by means of a rotary pump 31 (FIG. 2) which is belt driven from an electric motor 32. Air enters the pump through an inverted elbow coupling 33 and an air cleaner 34. The pump discharges through an outlet pipe 35 which has two branches 36 and 37. Branch 36 is connected to an inlet member 38 on the lower side of mixing and conveying device 28. Branch 37 is connected to furnish air to a device which will be described presently.

Referring again to FIG. 4 the body member 27 of the pneumatic mixing and conveying device 28 is a generally cylindrical member whose outside diameter is reduced at its left end and secured in any desired manner in the opening in the vertical wall 26. The hollow member 29 is also a cylindrical member of smaller external diameter than the interior 27 and these two members are mounted in coaxial position to leave between them an annular space 40. Member 29 has an external shoulder 41 and beyond this a portion 42 of reduced diameter which is externally threaded into an aperture at the inner end of member 28 and the two parts are assembled by engaging these threads and causing shoulder 43 at the outer end of member 29 to be brought into engagement with the right end of member 28.

Spaced somewhat to the right of external shoulder 41 hollow member 29 has an internal shoulder 44, and extending between these shoulders there is a series of drilled passageways 45. These passageways communicate between the annular space 40 and the interior of member 29 and are located at an angle of about 15° to the longitudinal axis of member 29. The air entering inlet 38 and passing through annular space 40 and passageways 45 is discharged in a series of jet-like streams and causes plastic material from pocket 25 to be drawn through the interior of reduced portion 42 of member 29. The plastic material is then forced forwardly by the air jets and the action of these jets causes the two kinds of plastic material, namely: the ground, used plastic and the fresh plastic to be thoroughly and intimately mixed together as it is conveyed by the air stream through the pipe 30 to the hopper 4 of the plastic molding machine. The plastic settling into pocket 25 readily enters the open horizontal throat of reduced portion 42 under the suction produced by the air jets.

The bin 24 which contains the fresh plastic is supported by means of two parallel and approximately L-shaped sheet metal plates 46 one of which may be seen in FIG. 1 and the other of which may be seen in FIG. 2. These plates project to the right from the respective side frame sections 8 on which they are mounted. The upright legs of these members are welded to the converging side bottom members 47 of bin 24.

Figure 3:
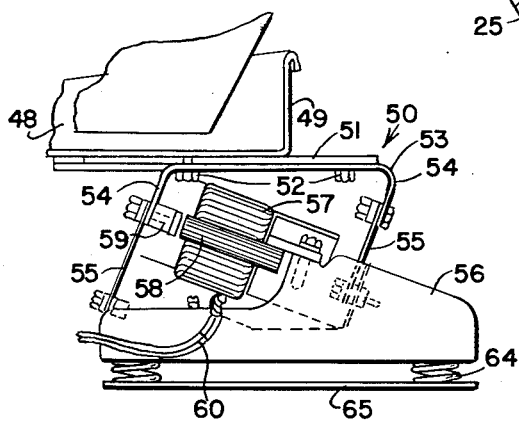
FIG. 3 is a somewhat enlarged detail view in side elevation of a part of the feeding mechanism for supplying the fresh plastic material.

The outlet of bin 24 is at the bottom of these side members 47 and discharges into a short trough member 48 of generally rectangular cross-section which is closed at its right or rear end by an upright wall 49 and whose open left-hand end discharges into funnel member 23. Trough member 48 is a part of a vibratory feeding device or feeder and, as such, is mounted upon the vibratory mechanism 50 thereof as shown in FIG. 3. The mechanism shown is electro-magnetically operated and is known in the trade as the Syntron feeder. Trough 48 is secured to a substantially rigid plate 51 which is, in turn, attached by means of cap screws 52 to a second substantially rigid member 53 having two downwardly directed leg portions 54. These leg portions are parallel to one another but are not perpendicular to the body portion of member 53.

These parts are supported by two parallel stiff plate springs 55 bolted at their upper ends to the leg portions and at their lower ends to a supporting base 56 which is a block of cast iron of considerable mass an weight. The vibratory motion is imparted to members 53, 51 and trough 48 by means of an electromagnet having an operating coil 57, the core 58 of which is firmly secured to base 56 by means of the screws indicated and which has a cooperating armature 59 which is secured by means of screws or otherwise to forward leg portion 54.

Wire 60 for supplying electrical energy to coil 57 extend from a control box 61 which is provided with a toggle control switch 62 and a current regulating knob 63 by means of which the amount of current through coil 57 may be changed in small increments. The base 56 for the vibratory feeder is supported on four coil springs 64 which rest upon a shelf 65 mounted between the two parallel L-shaped supporting plates 46.

The bin 24 for the fresh plastic material is automatically kept filled by means of the air-lift device 3. This plastic material is usually in the form of pellets of approximately ⅛" size and is received from the manufacturer in barrels or drums such as indicated at 66.

The air-lift device 3 is a slender, spear-like structure consisting of a specially constructed tubular member 67 terminating at its lower end in a sharpened head 68 for insertion into the mass of plastic in drum 66 and to the bottom thereof. The tubular member is of sufficient length to extend upwardly along the side of bin 24 to which it may be removably secured in position as shown in FIG. 1 by means of a releasable clamp member 69. This clamp may be hinged at its rear side to a bracket 70 mounted on the side of bin 24, and at its other side secured to the bracket by means of a wing nut or wing screw 71.

Figure 6:
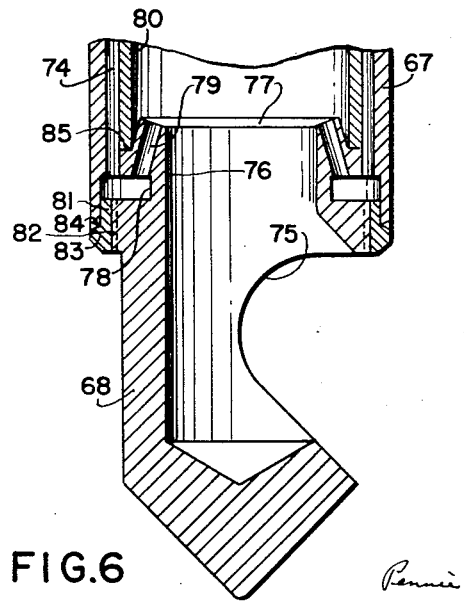
FIG. 6 is a view in vertical, central section drawn to a considerably enlarged scale of the lower end portion of the air lift device shown in FIG. 5.

At a point above drum 66 tubular member 67 has an air connection 72 to which air is supplied by means of a flexible hose 73 which is connected to branch pipe 37 leading from the air pump 31. The interior of air connection 72 is connected to an annular passage 74 (FIG. 6) which extends from the head 68 upwardly to connection 72.

Head 68 is pointed at its lower end, and has a lateral opening 75 in one side for the entrance of the plastic granules. This opening communicates with an interior cylindrical bore 76 which extends upwardly to the top of the head member 68 which terminates in a thick rim portion 77. The outer surface head member 68 near its upper end has a deep lateral groove 78 which communicates with annular passage 74. Drilled passages 79 extend from groove 78 to the thick rim portion 77 and are placed at approximately the same angle to the axis of the spear-like member as the jet passages 45 of device 48.

The annular passage 74 is formed between the inner surface of tubular member 67 and an interior tube 80 the upper end of which is welded to tube 67 at a point just above the air supply connection 72. The head member 68 is assembled on the tubular member 67 in the following manner: a ring member 81 which is internally threaded at 82 has a cylindrical portion which is fitted within the lower end of tubular member 67 and which is provided with an enlarged lower edge 83 which is welded at 84 to the end of member 67. Head member 68 is provided with threads to engage the threads 82 and when screwed in place a shoulder 85 near its upper end is firmly seated near the lower end of internal tube 80.

The air under pressure from pump 31 through hose 73 enters the connection 72 and passes downwardly through the annular space 74. Flowing through the jet passages 79 it draws in the plastic pellets or granules through the side opening 75 and then forces them upwardly through the interior of tube 80. They are conveyed to a point above connection 72 and thence through the interior of tubular member 67 to a curved tube or pipe 86 which turns them 180° and delivers them downwardly into bin 24. The plastic material as indicated at 87 is thus accumulated in the bin.

One of the advantages of my improved pneumatic mixing and conveying device and air-lift device 3 is the fact they they will both operate with great effectiveness on extremely low fluid pressure. For example, an air pressure of from 3 to 5 or 6 pounds per square inch is sufficient, and yet a remarkably large delivery of the combined plastic materials into the hopper 4 of the plastic molding machine is obtained. Similarly a high rate of delivery of the fresh plastic into bin 24 is obtained.

When the level of the plastic in bin 24 rises to the height of the discharge end of pipe 86 the delivery of the plastic material is slowed, and as the level rises slightly above the bottom of the pipe the delivery stops altogether, although the air continues to flow out of the end of the pipe and to escape through the plastic mass. As the level of this plastic mass 87 is lowered through the operation of the grinding, mixing and conveying apparatus, when the level descends below the bottom of the pipe, the delivery of the plastic will be re-established. Hence, automatic regulation of the level of the plastic is obtained without the use of any auxiliary mechanism.

In the operation of the apparatus as a whole the apparatus 2 is moved up to the particular plastic molding machine with which it is desired to use it, and arranged at a convenient point alongside of this machine. Such arrangement need not necessarily be as illustrated in FIG. 1, but may be at either end of the molding apparatus or at either side, as desired. With the molding apparatus 1 in operation the operator, or operators, receive the molded articles with the molded plastic material formed by the mold channels, sprue, etc., attached to them, and they separate the molded articles from the sprue scrap. The scrap is continuously placed by the operators in the mouth 11 of the hopper 10 of the grinding apparatus.

This mouth is provided with a shelf 88 on which the scrap may be placed and is closed by a swinging door 89 which is hinged at 90 to the top of the hopper. By pushing the plastic along shelf 88 the door 89 is opened automatically and the plastic descends by gravity along the steeply inclined inner portion 91 of the shelf and drops into the hopper. This arrangement constitutes a safety device to protect the operators from any possible chance of extending their hands or arms into the hopper sufficiently to reach the cutter 13. A second hinged cover portion 92 is provided for the hopper, to give access for adjustment of the cutting mechanism, or otherwise.

As the scrap plastic is continuously fed into the hopper it is continuously ground by the cutting mechanism 12 and descends in a continuous manner into the receptacle 22. At the same time the fresh plastic from bin 24 is fed into the chamber 22 by trough 48 of the vibratory mechanism 50. The control knob 63 of this mechanism is adjusted to control the rate of feed of the plastic material by trough 48 into funnel member 23 and chamber 22.

Since the molding apparatus 1 operates automatically the rate of production of the molded articles is approximately constant and, therefore, the rate of production of the sprue scrap is also constant, and for this reason the rate of feed of the scrap into hopper 10 is approximately constant and known. Accordingly the knob 63 can be adjusted to regulate the amount of fresh plastic so that it will be supplied in the proper proportion to that of the ground scrap plastic.

Whenever it is necessary to replace empty drum 66 with a new drum of fresh plastic, the spear-like air-lift device 3 is released from its support by turning the wing nut 71 and then removing it from the empty drum. Then a new drum is brought up and the spear pushed down to the bottom of the mass of plastic and the upper end of the spear resecured in position.

Figure 5:
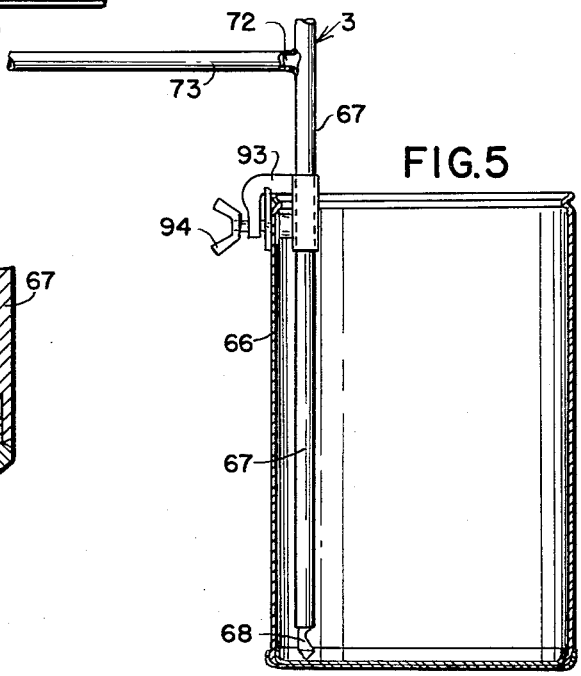
FIG. 5 illustrates the pneumatic air lift device for transferring the fresh plastic from a shipping container to the fresh plastic bin on the grinding apparatus of FIGS. 1 and 2.

If desired, instead of securing the spear-like air-lift member to the side of bin 24, it may be supported in position by the clamping mechanism shown in FIG. 5 which engages the top of the drum. This comprises a clamp 93 which is mounted on the tubular member 67 and provided with a manually adjusted clamping screw 94.

It will be understood that while I have described my invention in connection with one particular embodiment thereof, various changes may be made and that, therefore, the scope of the invention is set forth in the appended claim.

I claim:

Apparatus for grinding plastic scrap and blending with fresh plastic, comprising a movable frame structure adapted to be moved alongside a plastic molding machine, mechanism for grinding plastic scrap mounted on said frame structure, an electric motor mounted on said frame operatively connected to drive said grinding mechanism, a hopper supported by said frame above said mechanism for supplying plastic scrap thereto, a mixing chamber receiving the ground plastic scrap beneath said mechanism, said mixing chamber having an inlet opening, a bin for fresh plastic material supported on said frame, fresh plastic feeding means carried by said frame for receiving fresh plastic from said bin and delivering it into said opening, means for controlling said feeding means to regulate the amount of fresh plastic delivered to said chamber, a pneumatic mixing and conveying device arranged at the bottom of the mixing chamber to receive from said chamber said ground plastic scrap and said fresh plastic, a conveyer pipe one end of which is supported by said frame and leading from said device to the molding machine, an airlift device adapted to be placed in a container for withdrawing fresh plastic from the container and delivering it to said bin, and a common supply of air under pressure for operating said mixing and conveying device and said air-lift device comprising an electrically-driven air pump, both said pump and said motor being mounted on said frame, and said air-lift device being connected to said common air supply by means of a flexible hose to permit movement of the airlift device for transfer from an empty to a full container of fresh plastic.

References Cited in the file of this patent

UNITED STATES PATENTS

| | | |
|---|---|---|
| 1,250,918 | MacMichael | Dec. 18, 1917 |
| 2,118,182 | Flint | May 24, 1938 |
| 2,213,640 | Stone | Sept. 3, 1940 |
| 2,301,617 | Cox et al. | Nov. 10, 1942 |
| 2,382,655 | Nichols | Aug. 14, 1945 |
| 2,419,386 | Berg | Apr. 22, 1947 |
| 2,486,346 | Wachs | Oct. 25, 1949 |
| 2,523,137 | Nichols et al. | Sept. 19, 1950 |
| 2,541,899 | Wellman | Feb. 13, 1951 |